(12) United States Patent
Kaushik et al.

(10) Patent No.: US 7,146,514 B2
(45) Date of Patent: Dec. 5, 2006

(54) DETERMINING TARGET OPERATING FREQUENCIES FOR A MULTIPROCESSOR SYSTEM

(75) Inventors: Shivnandan D. Kaushik, Portland, OR (US); Ping Sager, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 373 days.

(21) Appl. No.: 10/625,442

(22) Filed: Jul. 23, 2003

(65) Prior Publication Data

US 2005/0022038 A1 Jan. 27, 2005

(51) Int. Cl.
  *G06F 1/32* (2006.01)
(52) U.S. Cl. ........................ 713/322; 713/300; 713/310; 713/320; 713/321; 713/323; 713/324; 713/330; 713/340
(58) Field of Classification Search ................ 713/300, 713/320–324, 310, 330, 340
See application file for complete search history.

(56) References Cited

U.S. PATENT DOCUMENTS

| | | | | |
|---|---|---|---|---|
| 6,119,241 A * | 9/2000 | Michail et al. | ............. | 713/322 |
| 6,141,762 A * | 10/2000 | Nicol et al. | ................. | 713/300 |
| 6,460,122 B1 * | 10/2002 | Otterness et al. | ........... | 711/154 |
| 6,470,456 B1 * | 10/2002 | Chung-Chih | ................ | 713/322 |
| 6,574,739 B1 * | 6/2003 | Kung et al. | ................. | 713/322 |
| 6,718,474 B1 * | 4/2004 | Somers et al. | .............. | 713/322 |
| 6,745,335 B1 * | 6/2004 | Kusano | ....................... | 713/324 |
| 6,788,156 B1 * | 9/2004 | Tam et al. | ..................... | 331/49 |
| 6,829,713 B1 * | 12/2004 | Cooper et al. | .............. | 713/320 |
| 6,836,849 B1 * | 12/2004 | Brock et al. | ................ | 713/310 |
| 6,859,886 B1 * | 2/2005 | Johnson | ....................... | 713/600 |
| 6,871,219 B1 * | 3/2005 | Noordergraaf et al. | ..... | 709/214 |
| 6,883,104 B1 * | 4/2005 | Rosch | ......................... | 713/322 |
| 6,901,521 B1 * | 5/2005 | Chauvel et al. | ............ | 713/300 |
| 6,901,522 B1 * | 5/2005 | Buch | .......................... | 713/320 |
| 6,931,557 B1 * | 8/2005 | Togawa | ...................... | 713/323 |
| 6,978,389 B1 * | 12/2005 | Jahnke | ....................... | 713/322 |
| 6,993,669 B1 * | 1/2006 | Sherburne, Jr. | ............. | 713/322 |
| 7,013,406 B1 * | 3/2006 | Naveh et al. | ............... | 713/501 |
| 2004/0249601 A1 * | 12/2004 | Circenis | ..................... | 702/178 |

OTHER PUBLICATIONS

Marr, Deborah T., et al. "Hyper-Threading Technology Architecture and Microarchitecture". Intel Technology Journal, vol. 6, No. 1, Feb. 2002, pp. 4-15.
"Mobile Intel® Pentium® III Processors—Intel SpeedStep® Technology" Intel Corporation. http://www.intel.com/support/processors/mobile/pentiumiii/ss.htm. Mar. 24, 2003.
"Windows Platform Design Notes-Designing Hardware for the Microsoft® Windows® Family of Operating Systems-Windows Native Processor Performance Control", Microsoft® Corporation. Nov. 12, 2003.

* cited by examiner

*Primary Examiner*—A. Elamin
(74) *Attorney, Agent, or Firm*—Trop, Pruner & Hu, P.C.

(57) ABSTRACT

In one embodiment of the present invention, a method includes determining utilization values for a plurality of processors having power utilization dependencies, and identifying a target frequency for the plurality of processors based on the utilization values.

26 Claims, 3 Drawing Sheets

DETERMINING TARGET OPERATING FREQUENCIES FOR A MULTIPROCESSOR SYSTEM

BACKGROUND

The present invention relates to power management of a computer system and more particularly to power management for a multiprocessor system.

Multiprocessor computer systems include multi-threaded processors in which a single physical processor is segmented into multiple logical processors, and multicore processors in which multiple processor cores are present in a single package or plural packages.

Mobile computers such as notebook personal computers (PCs) typically incorporate certain power management techniques. One such technique is an adaptive technology which provides for changing both the operating voltage and frequency of the processor such that transition to a lower frequency (i.e., performance) point leads to a cubic reduction in power consumption by the processor at the lower frequency point. Current operating systems use this technique so that the processor is placed at an operating frequency that matches the processor utilization. For example if the processor is idle 50% of the time, then the operating system places the processor at a frequency that is 50% of the maximum operating frequency. However, such techniques can have a deleterious effect on multiprocessor systems, as a frequency change on one processor might get applied to other system processors, which may due to their processor utilization desire higher operating frequencies. Thus a need exists to provide power management techniques for multiprocessor systems.

DETAILED DESCRIPTION

Figure 1:
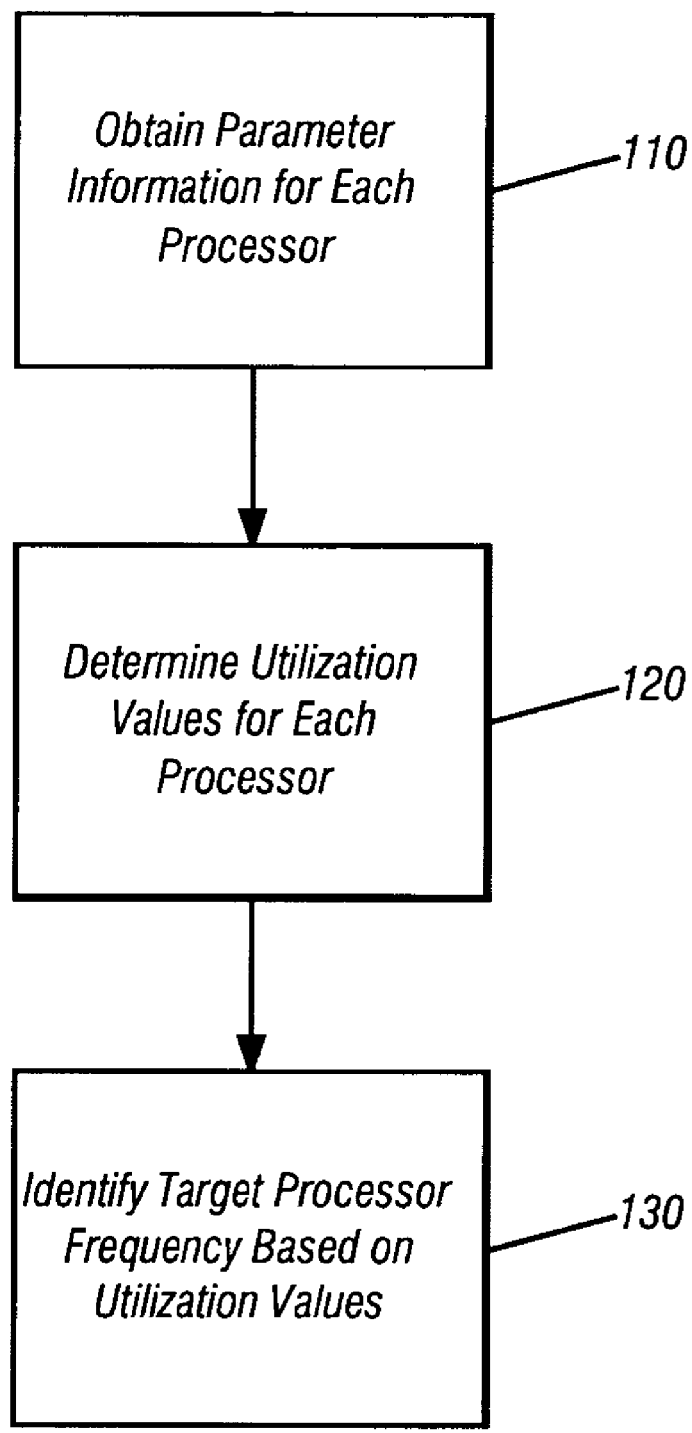
FIG. 1 is flow diagram of a method in accordance with one embodiment of the present invention.

Referring to FIG. 1, shown is flow diagram of a method in accordance with one embodiment of the present invention. As shown in FIG. 1, the method begins by obtaining parameter information for each processor of a system (block 110). In some embodiments, the processors may be logical processors while in other embodiments the processors may be multicore processors, either in a single physical package or separate physical packages. Further, in certain embodiments the processors may have dependencies with respect to power utilization and/or frequency transitions.

While parameter information may vary in different embodiments, in one embodiment the parameter information may include a sample interval (S), an up threshold percentage (U), an up threshold time (UT), a down threshold percentage (D), and a down threshold time (DT), as will be discussed below.

Based upon the parameter information, a utilization value may be determined for each processor (block 120). In one embodiment, the utilization value may be a transition decision for each processor. For example, in one embodiment an up/down decision may be made, meaning that a decision may be made as to whether that processor frequency should be raised or lowered. In alternate embodiments, a utilization value such as processor usage as a percentage of a maximum operating frequency may be used to obtain an up/down decision. Still further, in other embodiments a utilization value may be determined without reference to transition decisions.

Finally in the embodiment of FIG. 1, based upon the utilization values, a target processor frequency may be identified (block 130). For example, in one embodiment up/down decisions for the processors may be used to determine a target processor frequency for the multiple processors.

Thus in certain embodiments, the present invention may provide an adaptive algorithm for coordinating between logical processors of a multithreaded processor or between multiple cores of a multicore processor. In certain embodiments, the multithreaded processor may be enabled for Hyper-Threading technology. In certain multicore processors, frequency control logic may be shared among the cores.

In one embodiment of the present invention, an algorithm may use a number of parameters to determine an up/down decision for each processor present. These parameters may include a sample interval (S), an up threshold percentage (U), an up threshold time (UT), a down threshold percentage (D), and a down threshold time (DT), in one embodiment.

In such an embodiment, the sample interval may be the time interval at which frequency determinations may be made. While the time for such intervals may vary, in certain embodiments, S may be between approximately 10 and 100 milliseconds (ms). The up threshold percentage may be a processor utilization percentage above which an up decision may be made. In one embodiment, U may be approximately 60%, meaning that if a processor usage is more than 60%, the transition decision may be an up decision. The up threshold time may be the interval of time at which the up threshold percentage is analyzed. In one embodiment, UT may be approximately 100 ms. The down threshold percentage may be a processor utilization percentage below which a down decision is made. In one embodiment, DT may be approximately 30%. The down threshold time may be the time interval at which down transition decisions may be made. In certain embodiments, DT may be between approximately 500 to 1000 ms.

In one embodiment, an algorithm may include two phases applied at every S interval of time, which in certain embodiments may occur whenever a given processor (e.g., processor X) enters an operating system (OS) idle loop. In the first phase, an up/down decision may be determined for every processor of the system (including itself). In certain embodiments, the decision may be determined for all processors with which processor X shares transition logic and/or has transition dependencies.

In this embodiment, the following algorithm may be applied for each processor: if processor utilization for processor X over the past UT time interval is more than U%, then the transition decision for processor X may be up. However, if processor utilization for processor X over the past DT interval of time is less than D%, then the transition decision for processor X may be down. This algorithm may be performed for each processor of the multiprocessor system.

Next, in this embodiment the second phase may determine a collective decision for all processors of the system. In such manner, the appropriate target frequency to which the physical package should transition may be identified.

While many options may be used for the collective decision, in certain embodiments the decision may depend on whether there is a preference for performance optimization or power saving.

In one embodiment, the following option may provide a preference for performance by responding immediately to a need for compute power by any processor in a system by transitioning the physical package to a higher frequency. Specifically, if any processor has reached an up transition decision, then the physical package may be transitioned to a higher frequency. The target higher frequency for the package may be the frequency operating point closest to the maximum utilization among all the processors multiplied by the maximum operating frequency, in one embodiment. On the other hand, if all processors have reached a down transition decision, then the physical package may be transitioned to a lower frequency. The target lower frequency for the package may be the frequency operating point closest to the maximum utilization among all processors multiplied by the maximum operating frequency, in one embodiment.

Figure 2:
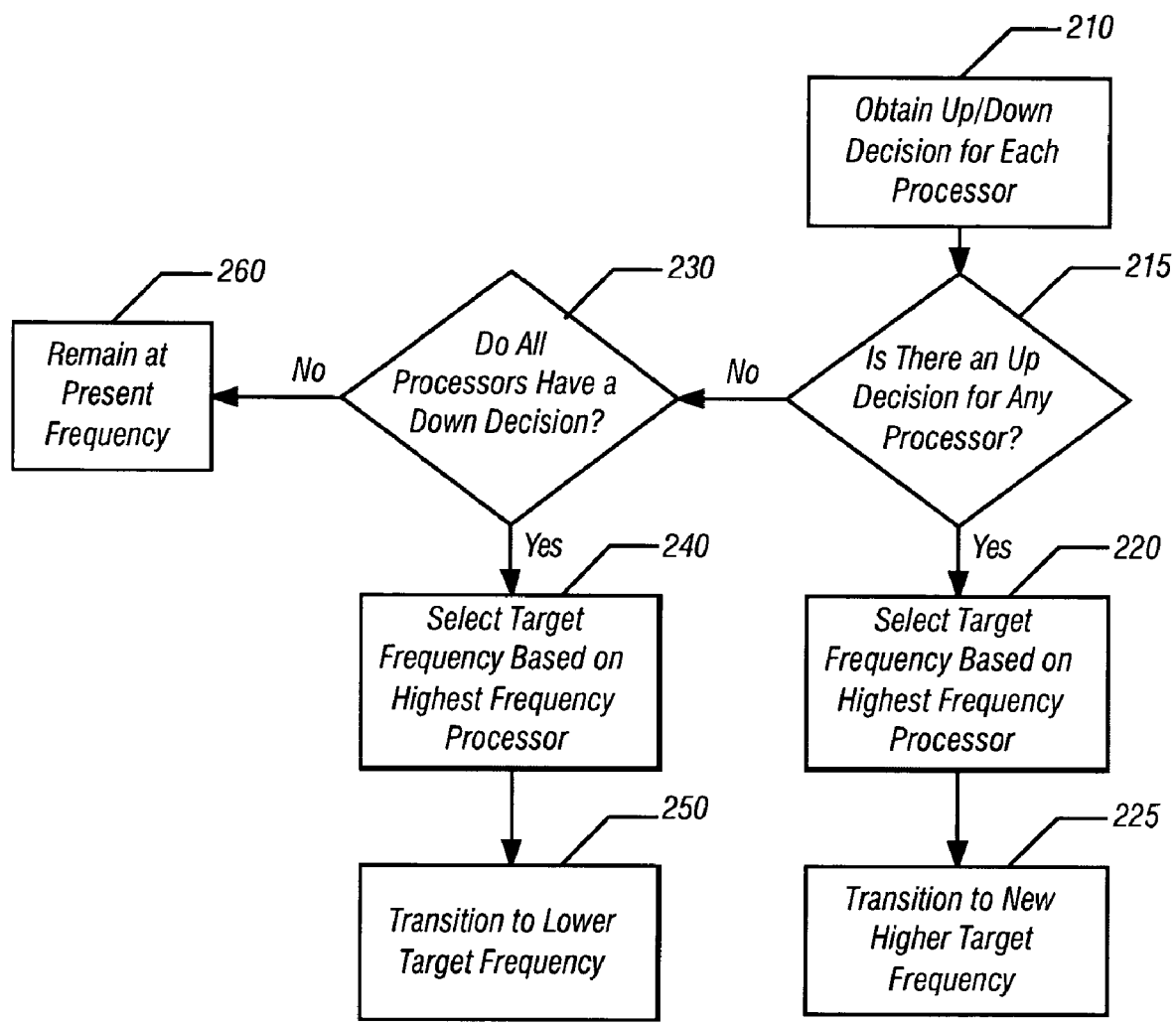
FIG. 2 is a flow diagram of determining a target frequency for a physical processor package in accordance with one embodiment of the present invention.

Referring now to FIG. 2, shown is a flow diagram of a method for determining a target frequency for a physical package in accordance with one embodiment of the present invention. As shown in FIG. 2, up/down decisions may be obtained for each processor (block 210). Next it may be determined whether there is an up decision for any of the processors (diamond 215). If so, a target frequency may be selected based on the highest utilization processor (block 220). For example, in one embodiment the target frequency may be equal to a frequency operating point of the processor closest to the maximum utilization among all of the processors multiplied by the maximum operating frequency. Then the processor package may be transitioned to the new higher frequency (block 225).

If instead at diamond 215 it is determined that there is no up decision for any processor, it next may be determined whether all processors have a down decision (diamond 230). If all such processors have a down decision, then a target frequency may be selected based on the highest utilization processor (block 240). For example, in one embodiment a target frequency may be equal to a frequency operating point closest to the maximum utilization among all of the processors multiplied by the maximum operating frequency. Then, the processor package may be transitioned to the new lower target frequency (block 250).

Still referring to FIG. 2, if all of the processors did not have a down decision, the target frequency of the processor package may remain at its present frequency (block 260).

Other embodiments may choose to combine the individual up or down decisions for each processor in a different fashion, leading to a different target frequency and power for the processor package. For instance, it may be possible to combine the individual up or down decisions for each processor such that the processor package makes a down transition if any processor has a down decision and an up transition only if all the processors have an up decision. In certain embodiments, an operating system may choose to use the different embodiments at different times during its operation depending on the specific power/performance needs at that point of time.

Embodiments may be implemented in a computer program. As such, these embodiments may be stored on a storage medium having stored thereon instructions which can be used to program a computer system such as a notebook computer, wireless device or the like to perform the embodiments. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static ROMs, erasable programmable read-only memories (EPROMs), electrically erasable programmable read-only memories (EEPROMs), flash memories, magnetic or optical cards, or any type of media suitable for storing electronic instructions. Similarly, embodiments may be implemented as software modules executed by a programmable control device, such as a computer processor or a custom designed state machine.

Figure 3:
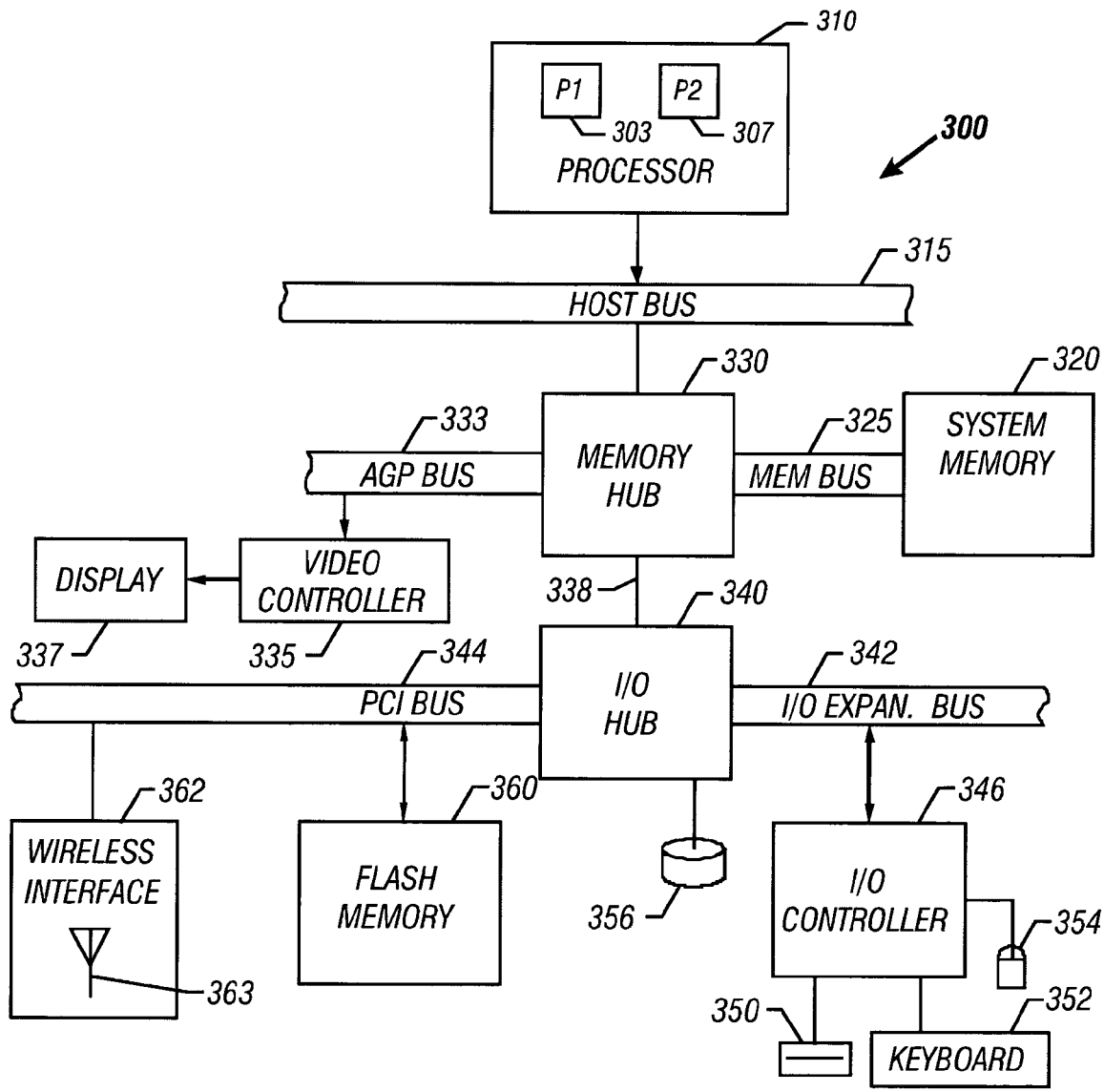
FIG. 3 is a block diagram of a system with which embodiments of the present invention may be used.

FIG. 3 is a block diagram of a representative data processing system, namely computer system 300 with which embodiments of the invention may be used. In one embodiment, computer system 300 includes a processor 310, which may include a general-purpose or special-purpose processor such as a microprocessor, microcontroller, application specific integrated circuit (ASIC), a programmable gate array (PGA), and the like. As shown in FIG. 3, processor 310 may be a multithread or multicore processor including a first processor 303 (P1) and a second processor 307 (P2).

The processor 310 may be coupled over a host bus 315 to a memory hub 330 in one embodiment, which may be coupled to a system memory 320 via a memory bus 325. The memory hub 330 may also be coupled over an Advanced Graphics Port (AGP) bus 333 to a video controller 335, which may be coupled to a display 337. The AGP bus 333 may conform to the Accelerated Graphics Port Interface Specification, Revision 2.0, published May 4, 1998, by Intel Corporation, Santa Clara, Calif.

The memory hub 330 may also be coupled (via a hub link 338) to an input/output (I/O) hub 340 that is coupled to a input/output (I/O) expansion bus 342 and a Peripheral Component Interconnect (PCI) bus 344, as defined by the PCI Local Bus Specification, Production Version, Revision 2.1 dated in June 1995, or alternately a bus such as the PCI Express bus, or another third generation I/O interconnect bus. The I/O expansion bus 342 may be coupled to an I/O controller 346 that controls access to one or more I/O devices. As shown in FIG. 3, these devices may include in one embodiment storage devices, such as a floppy disk drive 350 and input devices, such as keyboard 352 and mouse 354. The I/O hub 340 may also be coupled to, for example, a hard disk drive 356 as shown in FIG. 3. It is to be understood that other storage media may also be included in the system. In an alternate embodiment, the I/O controller 346 may be integrated into the I/O hub 340, as may other control functions.

The PCI bus 344 may be coupled to various components including, for example, a flash memory 360. Further shown in FIG. 3 is a wireless interface 362 coupled to the PCI bus 344, which may be used in certain embodiments to communicate with remote devices. As shown in FIG. 3, wireless interface 362 may include a dipole or other antenna 363 (along with other components not shown in FIG. 3). In various embodiments, wireless interface 362 may be coupled to system 300, which may be a notebook personal computer, via an external add-in card, or an embedded device. In other embodiments, wireless interface 362 may be fully integrated into a chipset of system 300.

Although the description makes reference to specific components of the system 300, it is contemplated that numerous modifications and variations of the described and illustrated embodiments may be possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   determining utilization values for a plurality of processors having power utilization dependencies;
   identifying a target frequency for the plurality of processors based on the utilization values; and
   transitioning a processor package including the plurality of processors to the target frequency, wherein the target frequency comprises a higher frequency if any of the utilization values is an up transition decision, and the target frequency comprises a lower frequency if all of the utilization values are a down transition decision.

2. The method of claim 1, wherein identifying the target frequency comprises identifying a frequency operating point closest to a maximum operating frequency of the processor package multiplied by a maximum utilization of one of the plurality of processors having a highest value for the maximum utilization.

3. The method of claim 1, wherein the plurality of processors comprise a plurality of logical processors.

4. The method of claim 1, wherein the plurality of processors comprise at least one multicore processor.

5. The method of claim 1, wherein the plurality of processors have frequency transition dependencies.

6. The method of claim 1, further comprising determining the utilization values for the plurality of processors in a selected one of the plurality of processors.

7. The method of claim 1, further comprising determining the up transition decision for a corresponding one of the plurality of processors having a usage level greater than a first threshold.

8. The method of claim 7, further comprising determining the down transition decision for a corresponding one of the plurality of processors having a usage level lower than a second threshold.

9. A method comprising:
   determining utilization decisions for logical processors of a physical processor using parameter information and
   calculating a target frequency for the physical processor based on the utilization decisions via combining the utilization decisions according to a first algorithm to obtain a first target frequency for the physical processor in a first operation mode, and combining the utilization decisions according to a second algorithm to obtain a second target frequency for the physical processor in a second operation mode.

10. The method of claim 9, further comprising transitioning the physical processor to one of the first or second target frequencies.

11. The method of claim 9, further comprising transitioning the physical processor to a higher frequency if any of the logical processors has an up utilization decision.

12. The method of claim 11, wherein the higher frequency is based on a highest utilization processor of the logical processors.

13. The method of claim 9, further comprising transitioning the physical processor to a lower frequency if all of the logical processors have a down utilization decision.

14. The method of claim 13, wherein the lower frequency is based on a highest utilization processor of the logical processors.

15. The method of claim 10, wherein transitioning the physical processor comprises transitioning to a higher frequency if any of the logical processors needs additional compute power.

16. The method of claim 9, wherein calculating the target frequency is based on desired power and performance characteristics.

17. An article comprising a machine-readable storage medium containing instructions that if executed enable a system to:
    determine utilization values for a plurality of processors having power utilization dependencies, wherein the utilization values comprise an up transition decision or a down transition decision for each of the plurality of processors; and
    identify a target frequency for the plurality of processors based on an aggregation of the utilization values.

18. The article of claim 17, further comprising instructions that if executed enable the system to transition a processor package to the target frequency, the processor package including the plurality of processors.

19. The article of claim 18, further comprising instructions that if executed enable the system to identify a frequency operating point closest to a maximum operating frequency of the processor package multiplied by a maximum utilization of one of the plurality of processors having a highest value for the maximum utilization.

20. The article of claim 18, further comprising instructions that if executed enable the system to transition the processor package to a higher frequency if any of the plurality of processors needs additional compute power.

21. The article of claim 18, further comprising instructions that if executed enable the system to transition the processor package to a lower frequency if any of the plurality of processors needs less power.

22. The article of claim 17, wherein the plurality of processors have frequency transition dependencies.

23. A system comprising:
    a plurality of processors; and
    a dynamic random access memory containing instructions that if executed enable the system to determine utilization values for the plurality of processors and to aggregate the utilization values to obtain a target frequency at which to operate the plurality of processors based on the aggregated utilization values.

24. The system of claim 23, wherein the plurality of processors comprises a plurality of logical processors within a processor package.

25. The system of claim 24, further comprising instructions that if executed enable the system to obtain the target frequency corresponding to a frequency operating point closest to a maximum operating frequency of the processor package multiplied by a maximum utilization of one of the plurality of logical processors having a highest value for the maximum utilization.

26. The system of claim 24, further comprising instructions that if executed enable the system to transition the processor package to a higher frequency if any of the plurality of logical processors needs additional compute power.

* * * * *